United States Patent [19]

Hacskaylo

[11] Patent Number: 4,557,569
[45] Date of Patent: Dec. 10, 1985

[54] DISTENDED POINT SOURCE REFLECTOR HAVING CONICAL SECTIONS

[75] Inventor: Michael Hacskaylo, Falls Church, Va.

[73] Assignee: The United States of America as represented by the Secretary of the Army, Washington, D.C.

[21] Appl. No.: 552,931

[22] Filed: Nov. 17, 1983

[51] Int. Cl.$^4$ .............................................. G02B 5/10
[52] U.S. Cl. ...................................................... 350/630
[58] Field of Search .......................................... 350/630

[56] References Cited

U.S. PATENT DOCUMENTS 2,759,106  8/1956  Wolter ................................. 350/294
2,766,385  10/1956  Herrnring et al. .................. 350/294

FOREIGN PATENT DOCUMENTS 1037720  8/1958  Fed. Rep. of Germany ...... 350/294
148598  1/1955  Sweden ................................. 350/294

Primary Examiner—John K. Corbin
Assistant Examiner—Richard F. Gallivan
Attorney, Agent, or Firm—Anthony T. Lane; Milton W. Lee; Aubrey J. Dunn

[57] ABSTRACT

A series of highly-reflective contiguous conical segments about an optic axis. The length of each segment side and the cone vertex angle of each cone is related to the overall desired size of the reflector, and the desired angle of radiation from the reflector.

6 Claims, 2 Drawing Figures

DISTENDED POINT SOURCE REFLECTOR HAVING CONICAL SECTIONS

The invention described may be manufactured, used, and licensed by the U.S. Government for governmental purposes without the payment of any royalties thereon.

BACKGROUND OF THE INVENTION

This invention is in the field of electromagnetic reflectors, and is particularly concerned with beam-shaping reflectors for optical radiation (light). Such reflectors are used to produce a collimated or other shaped beam from a point source, or may be used to focus collimated or other rays. Typical examples of the shapes of such reflectors are spherical, parabolic, and arrays of plane reflectors. U.S. Pat. No. 52,987 of Mar. 6, 1866 is an example of such a reflector. In order to produce a beam of a certain divergence from a point source, to which the invention is specifically directed, the usual ways are to employ an aperature in the source housing, or to employ a parabolic reflector with the source at the focus of the reflector and with an aperature to define the desired beam. The chief disadvantage with these ways is that only a portion of the light from the source falls in the desired beam. Obviously, one might employ the combination of a parabolic reflector to collimate all of the light from the source and a diverging lens to yield the desired beam angle. This combination is both more complex (two elements) and more expensive (parabolic reflector) than the inventive reflector, which uses only conic sections.

SUMMARY OF THE INVENTION

The invention is a reflector of point-source electromagnetic radiation which provides a predetermined solid cone of radiation, and the method for constructing such a reflector. The cone includes all of the radiation from the source, with a substantially uniform radiation flux in a cross-sectional area of the cone. The reflector is made of joined conical sections of different cone angles.

DETAILED DESCRIPTION OF THE INVENTION

Figure 1:
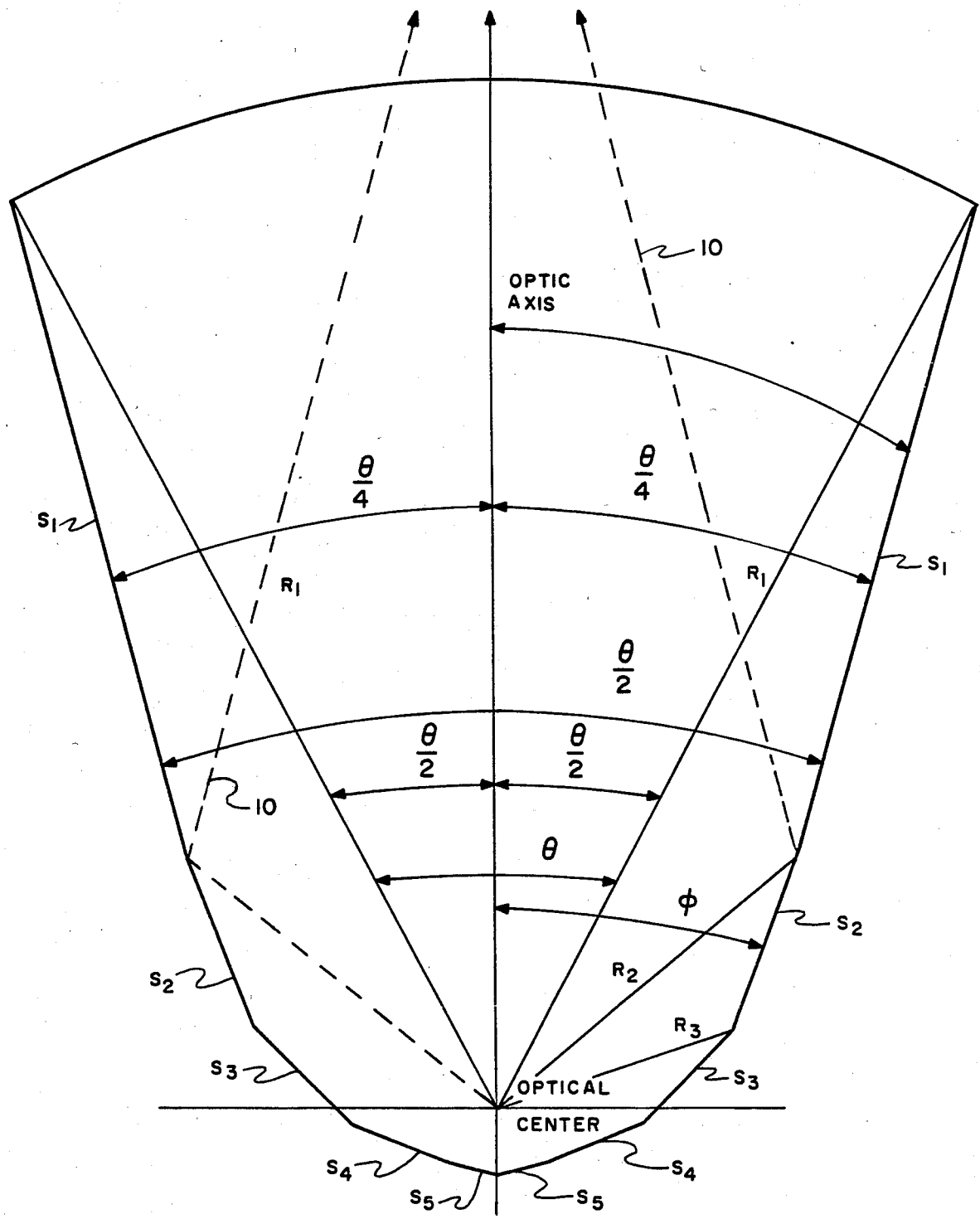
FIG. 1 shows a cross-sectional view of a reflective surface made in accordance with the invention.

The invention may be best understood if this description is taken in conjunction with the drawing. Referring to FIG. 1, the general shape, and some of the construction of a reflector mode in accordance with the invention, is shown. It is assumed that a point source of radiation will be placed at the optical center on the drawing. From this center, an arc, with a radius $R_1$ of approximately the length of the desired reflector, is drawn. An optic axis is drawn through the point and the arc, and line segments S1 are drawn, each segment subtending an angle $\theta/4$ with the optic axis. As shown on the drawing, the upper end of each S1 intersects the arc at the same place that each $R_1$ does, and the angle between each $R_1$ and the optic axis $\theta/2$. Thus, the angle between the $R_1$'s is $\theta$, wherein $\theta$ is the desired angle of radiation from the source. The lower end of each S1 is the point at which a ray from the optical center is reflected parallel to the S1 on the opposite side of the optic axis. Such a ray is shown as dashed line 10. If a ray were drawn from the optical center to the upper end of S1, this ray would be reflected parallel to the optic axis (see FIG. 2). The upper ends of line segments S2 join segments S1 at their lower ends, and segments S2 have lengths and angles with respect to the optic axis such that a ray from the lower end of S2 will be reflected parallel to the S2 on the opposite side of the optic axis. The angle $\phi$ of each S2 and each subsequent S with respect to the optic axis are predetermined in acordance with the following formula:

$$\phi_i = i\left(\frac{\theta}{2}\right)$$

wherein i is associated with the segment number Si such as S1, S2, etc., up to segment Sn, and $n = (360°/\theta) - 1$. If $360/\theta$ is not an integer, the length of Sn will be a fraction of the value of a calculated Sn. The length of R2, R3, or Ri may be calculated from the following formula:

$$R_i = R_1 \prod_{i=2}^{i \leq (\frac{2\pi}{\theta} - 1)} \frac{\sin\left[(i-1)\frac{\theta}{4}\right]}{\sin\left[\pi - (i+1)\frac{\theta}{4}\right]}$$

wherein $\theta$ is now exprressed in radians as a function of $\pi$, and i is a positive integer.

The general expression for the length of Si is as follows:

$$S_i = \frac{R_i \sin\frac{\theta}{2}}{\sin\left\{\pi - \left[\frac{\theta}{2} + (i-1)\frac{\theta}{4}\right]\right\}}$$

Figure 2:
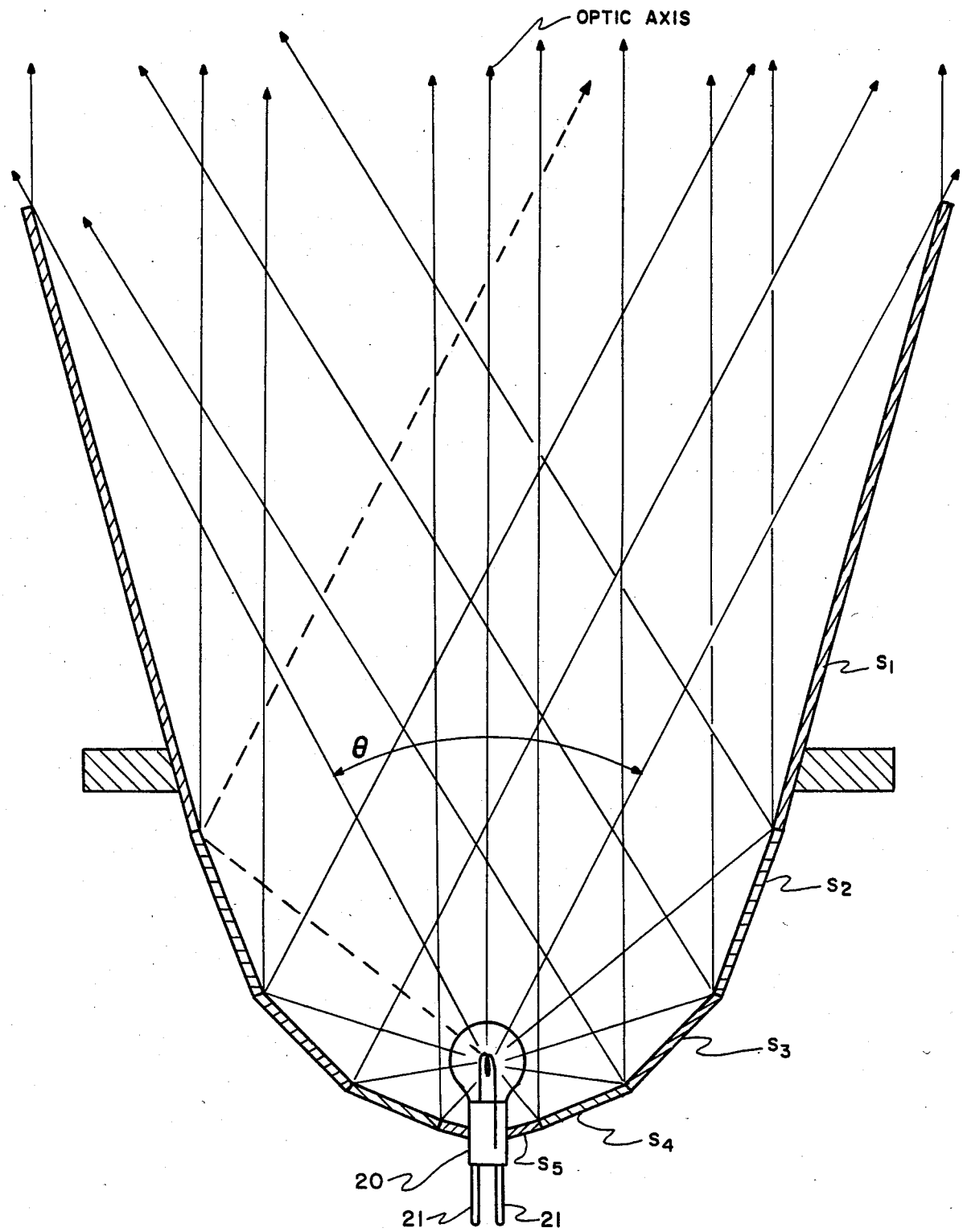
FIG. 2 shows a cross-sectional view of an inventive reflector with typical rays shown.

FIG. 2 shows a cross-sectional view of a reflector made in accordance with the invention, with typical rays shown from source (incandescent light bulb) 20 (with power leads 21). As can be seen, the ray impinging on the upper end of each Si segment is reflected parallel to the optic axis, and the ray impinging on the lower end thereof is reflected parallel to the section of Si on the opposite side of the optic axis.

Although the various Si's are shown as line segments, it should be understood that the actual reflector is composed of conical segments. The reflector may be made by any one of various techniques, all well known in the art. For example, it might be made by turning on a numerically controlled lathe, or by cutting sheet metal developments of the segments and bending these developments into shape. If plastic rather than metal is used, it would obviously be necessary to metalize the plastic to provide a highly reflective surface.

I claim:

1. A radiation reflector having a surface for reflecting radiation in a right circular cone of predetermined vertex angle $\theta$ from a point source of radiation, wherein the surface consists of contiguous conical segments having shapes as though generated by rotation of a continuous curve template about an axis, and whereby the curve is generated within a circle of radius $R_1$ with its center on said axis, and consists of a series of joined line segments having lengths Si related to $R_1$ and $\theta$, and at angles $\phi i$ with respect to said axis also related to $R_1$ and $\theta$, and wherein said point source is placed in said reflector at a position corresponding to the center of said circle.

2. The reflector as set forth in claim 1 wherein the angle $\phi i$ of each line segment with respect to said axis is defined by the following formula: $\phi i = i(\theta 2)$ wherein i is associated with each successive segment number.

3. The reflector as set forth in claim 2 wherein the distance Ri from the center of the circle to the lower end of each successive line segment is defined by the following formula:

$$R_i = R_1 \prod_{i=2}^{i \leq (\frac{2\pi}{\theta} - 1)} \frac{\sin\left[(i-1)\frac{\theta}{4}\right]}{\sin\left[\pi - (i+1)\frac{\theta}{4}\right]}$$

wherein $\theta$ is expressed in radians as a function of $\pi$, and i is a positive integer.

4. The reflector as set forth in claim 3 wherein the length Si of each line segment is defined by the following formula:

$$S_i = \frac{R_i \sin\frac{\theta}{2}}{\sin\left\{\pi - \left[\frac{\theta}{2} + (i-1)\frac{\theta}{4}\right]\right\}}.$$

5. The reflector as set forth in claim 1 wherein the distance Ri from the center of the circle to the lower end of each successive line segment is defined by the following formula:

$$R_i = R_1 \prod_{i=2}^{i \leq (\frac{2\pi}{\theta} - 1)} \frac{\sin\left[(i-1)\frac{\theta}{4}\right]}{\sin\left[\pi - (i+1)\frac{\theta}{4}\right]}$$

wherein $\theta$ is expressed in radians as a function of $\pi$, and i is a positive integer.

6. The reflector as set forth in claim 5 wherein the length Si of each line segment is defined by the following formula:

$$S_i = \frac{R_i \sin\frac{\theta}{2}}{\sin\left\{\pi - \left[\frac{\theta}{2} + (i-1)\frac{\theta}{4}\right]\right\}}.$$

* * * * *

UNITED STATES PATENT AND TRADEMARK OFFICE
CERTIFICATE OF CORRECTION

PATENT NO. : 4,557,569
DATED : December 10, 1985
INVENTOR(S) : MICHAEL HACSKAYLO It is certified that error appears in the above—identified patent and that said Letters Patent is hereby corrected as shown below:

Column 2, lines 25-30, column 3, lines 16-23, and column 4, lines 12-18, the correct formula is as follows:

$$R_i = R_1 \prod_{i=2}^{i \leq (\frac{2\pi}{\theta} - 1)} \frac{\sin\left[(i-1)\frac{\theta}{4}\right]}{\sin\left[\pi - (i+1)\frac{\theta}{4}\right]}$$

Column 2, line 31, "exprressed" should read "expressed".

Column 3, line 8, "$\phi i = i(\Theta 2)$" should read "$\phi i = i(\frac{\Theta}{2})$".

Signed and Sealed this

Tenth Day of June 1986

[SEAL]

Attest:

DONALD J. QUIGG

Attesting Officer   Commissioner of Patents and Trademarks